United States Patent [19]

Ehara

[11] Patent Number: 4,969,265

[45] Date of Patent: Nov. 13, 1990

[54] METHOD OF PRODUCTING METAL SUPPORT FOR EXHAUST GAS CATALYST

[75] Inventor: Hideharu Ehara, Tokyo, Japan

[73] Assignees: Calsonic Corporation, Tokyo; Nissan Motor Co., Ltd., Yokohama, both of Japan

[21] Appl. No.: 397,962

[22] Filed: Aug. 23, 1989

[30] Foreign Application Priority Data

Sep. 6, 1988 [JP] Japan .................... 63-222960

[51] Int. Cl.⁵ .................................. B21D 53/00
[52] U.S. Cl. .................................. 29/890; 29/418; 72/148; 502/439; 422/180
[58] Field of Search ............. 29/157 R, 418, 423, 29/460, 464, 527.4, 530, 890; 72/148; 422/177, 180; 502/439, 527

[56] References Cited

U.S. PATENT DOCUMENTS

| | | | |
|---|---|---|---|
| 2,721,952 | 10/1955 | Kenyon | 72/148 |
| 4,300,956 | 11/1981 | Rosenberger et al. | 422/180 |
| 4,318,888 | 3/1982 | Chapman et al. | 29/157 R |
| 4,598,063 | 7/1986 | Retallick | 29/157 R |

FOREIGN PATENT DOCUMENTS

| | | | |
|---|---|---|---|
| 63-54432 | 4/1988 | Japan . | |
| 3093329 | 4/1988 | Japan | 422/180 |
| 3093330 | 4/1988 | Japan | 422/180 |
| 1063044 | 3/1989 | Japan | 422/180 |
| 1469527 | 4/1977 | United Kingdom . | |
| 1491206 | 11/1977 | United Kingdom . | |
| 2051624 | 1/1981 | United Kingdom | 29/157 R |

*Primary Examiner*—Howard N. Goldberg
*Assistant Examiner*—I Cuda
*Attorney, Agent, or Firm*—Foley & Lardner, Schwartz, Jeffery, Schwaab, Mack, Blumenthal & Evans

[57] ABSTRACT

A method of producing a metal support for an exhaust gas catalyst. The method comprises the steps of: (a) mating respective end portions of flat and corrugated metal strips in such a manner that respective major portions of the strips extend in opposite directions; (b) putting the mated end portions of the strips between two generally flat holding members; (c) winding the major portions of the flat and corrugated metal strips around the holding members overlapping one on another by a predetermined number of times, thereby to produce an oval structure which includes the flat and corrugated metal strips and the holding members; (d) drawing the holding members from the oval structure thereby to provide a semi-processed oval assembly which has two generally flat bores left therein; and (e) pressing the semi-processed oval assembly in a manner to eliminate the bores thereby to provide a tightly wound oval assembly of the flat and corrugated metal strips.

5 Claims, 4 Drawing Sheets

FIG. 4A *(PRIOR ART)*
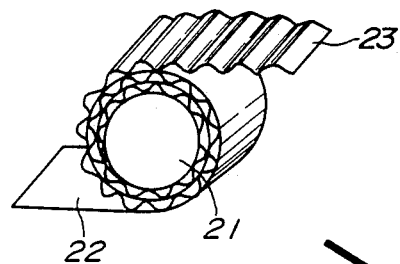
FIG. 4B
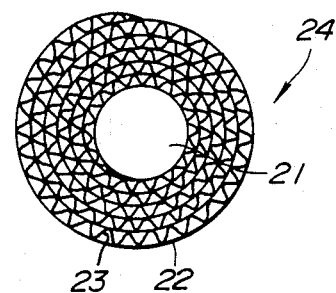
FIG. 4C
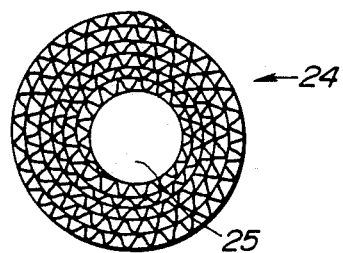
FIG. 4D
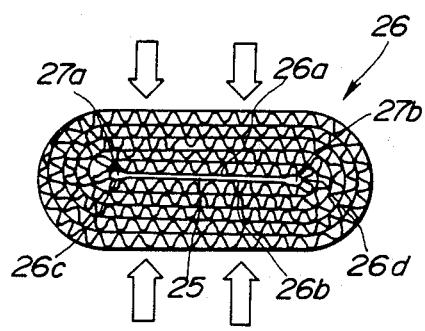

METHOD OF PRODUCING METAL SUPPORT FOR EXHAUST GAS CATALYST

BACKGROUND OF THE INVENTION

1. Field of the Invention

The present invention relates in general to a catalytic converter for use in a motor vehicle to purify the gases exhausted from an engine of the vehicle, and more particularly to a method of producing the catalytic converter. More specifically, the present invention is concerned with a method of producing a metal support for exhaust gas catalysts, which support is an essential element of the converter.

2. Description of the Prior Art

In order to clarify the object of the present invention, one conventional method of producing a metal support for exhaust gas catalysts will be described with reference to FIGS. 4A, 4B, 4C and 4D of the accompanying drawings. The method is disclosed in Japanese Utility Model First Provisional Publication 63-54432.

In this method, as is shown in FIG. 4A, at first, a flat metal strip 22 and a corrugated metal strip 23 are mated at their leading ends and, as is shown in FIG. 4B, they are wound around a common (cylindrical holding member 21) by a predetermined number of times to provide a cylindrical structure 24. Then, as is shown in FIG. 4C, the (cylindrical holding member 21) is drawn out at from the cylindrical structure 24. Thus, a semi-processed cylindrical assembly 24 with a center bore 25 is produced. Then, as is shown in FIG. 4D, the cylindrical assembly 24 is pressed in such a manner that the center bore 25 becomes flatly deformed. With this, the assembly 24 assumes an oval shape, which is generally designated by numeral 26. A suitable welding is then applied to the oval assembly 26 in order to keep the oval shape of the same. Then, by using a known catalyst coating technique, a suitable catalyst is coated on inner surfaces of the honeycomb cells thus defined by the oval assembly 26. Then, the fixed and catalyst-coated oval assembly 26 is housed in a shell (not shown) to provide a catalytic converter.

However, the method has the following inherent drawbacks to its inherency.

That is, as will be understood from FIGS. 4C and 4D, when the semi-processed cylindrical assembly 24 is pressed to assume the oval assembly 26, so-called "pockets" 27a and 27b at lateral ends of the flatly deformed bore 25 are inevitably formed. This undesired phenomenon will be better understood from FIG. 5 in which the phenomenon is shown exaggerately.

As can be seen from FIG. 5, upon completion of the pressing process the upper and lower inner walls 26a and 26b of the flatly deformed bore 25 get in contact with each other at their respective middle portions. However, at the laterally opposed ends 26c and 26d of the flatly formed bore 25 where a great change of curvature occurs during the pressing process, such contact does not occur causing the formation of the pockets 27a and 27b. Thus, if the catalytic converter is used with such an oval assembly 26 contained therein, the pockets 27a and 27b cause considerable decrease of the gas purification which is carried out by the catalytic converter. In fact, the exhaust gas from the engine is permitted to pass through the pockets 27a and 27b without being purified. Of course, such gas passing can be prevented by closing the pockets 27a and 27b with the catalyst in the catalyst coating process. However, in this case, a greater amount of catalyst is needed and thus the production cost of the converter is increased considerably.

SUMMARY OF THE INVENTION

It is therefore an object of the present invention to provide a method of producing a metal support for an exhaust gas catalyst, which method is free of the above-mentioned drawbacks.

According to the present invention, there is provided a method of producing a metal support for an exhaust gas catalyst. The method comprises the steps of: (a) mating respective end portions of flat and corrugated metal strips in such a manner that respective major portions of the strips extend in opposite directions; (b) putting the mated end portions of the strips between two generally flat holding members; (c) winding the major portions of the flat and corrugated metal strips round the holding members overlapping one on another by a predetermined number of times, thereby to produce an oval structure which includes the flat and corrugated metal strips and the holding members; (d) drawing the holding members from the structure thereby to provide a semi-processed oval assembly which has two generally flat bores left therein; and (e) pressing the semi-processed oval assembly in a manner to eliminate the bores thereby to provide a tightly wound oval assembly of the flat and corrugated metal strips.

BRIEF DESCRIPTION OF THE DRAWINGS

Other objects and advantages of the present invention will become apparent from the following description when taken in conjunction with the accompanying drawings, in which:

FIGS. 4A, 4B, 4C and 4D are drawings also similar to the drawings of FIGS. 1A to 1E, but show a conventional method.

DETAILED DESCRIPTION OF THE INVENTION

Referring to FIGS. 1A to 1E, there are shown steps for producing an improved metal support for an exhaust gas catalyst, which steps are employed in a first embodiment of the present invention.

Figure 1A:
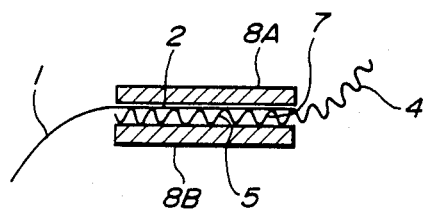
FIGS. 1A, 1B, 1C, 1D and 1E are drawings showing steps for producing a metal support for exhaust gas catalyst, which are employed in a first embodiment of the method of the present invention.

At first, as is shown in FIG. 1A, a flat metal strip 1 and a corrugated metal strip 4 are partially overlapped at their leading end portions 2 and 5 having their major portions directed in opposite directions. With this, a so-called "core portion" 7 is constituted by the leading end portions 2 and 5. Then, two flat holding members 8A and 8B, each having a rectangular cross section, are arranged to put the core portion 7 (viz. the overlapped leading end portions 2 and 5) between the holding members 8A and 8B to hold the core portion 7.

Figure 1B:
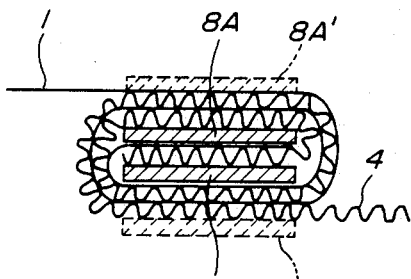
Figure 1C:
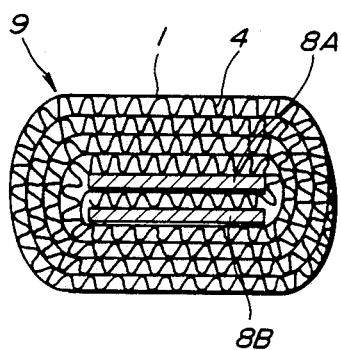
Figure 1D:
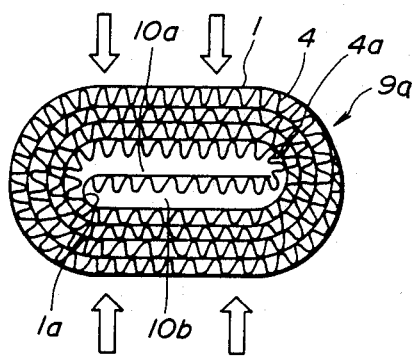
Figure 1E:
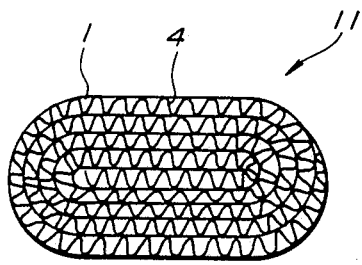

Then, as it can be seen from FIG. 1B, the flat metal strip 1 and the corrugated metal strip 4 are wound round the holding members 8A and 8B overlapping one on another. The winding of the metal strips 1 and 4 is repeated by a predetermined number of times to provide such an oval structure 9 as shown in FIG. 1C. Then, as it can be seen from FIG. 1D, the two holding members 8A and 8B are drawn from the oval structure 9 thereby leaving two flat bores 10a and 10b in the structure. With this, a semi-processed oval assembly 9 is produced. Then, the semi-processed oval assembly 9a is pressed in a manner to eliminate the bores 10a and 10b. With this, the semi-processed oval assembly 9a assumes a tightly wound oval shape as shown in FIG. 1E, which is generally designated by numeral 11. A spot welding is then applied to the oval assembly 11 to keep the shape of the same. Then, a suitable catalyst is applied to inner surfaces of the honeycomb cells of the oval assembly 11 by means of a known catalyst coating method. Then, the oval assembly 11, which has been thus fixed and coated with the catalyst, is housed in a shell (not shown) to provide a catalytic converter.

Figure 2:
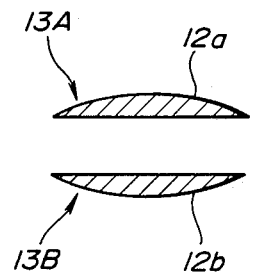
FIG. 2 is a sectional view of holding members which are usable in the method of the present invention.

If desired, as is shown in FIG. 2, holding members 13A and 13B each having an arcuate cross section 12a or 12b may be used on behalf of the afore-mentioned flat holding members 8A and 8B.

Furthermore, if desired, an additional pair of holding members may be used in the winding step shown in FIG. 1B. That is, when, after the two holding members 8A and 8B are set in place and the winding is repeated up to a certain number of times, additional holding members 8A' and 8B' (see FIG. 1B) are put on the semi-processed assembly and thereafter the winding is resumed.

Referring to FIGS. 3A to 3E, there are shown steps for producing an improved metal support, which steps are employed in a second embodiment of the present invention.

Figure 3A:
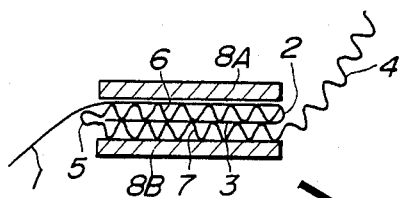
FIGS. 3A, 3C, 3D and 3E are drawings similar to the drawings of FIGS. 1A to 1E, but show a second embodiment of the method of the present invention.

At first, as is shown in FIG. 3A, a flat metal strip 1 is folded back at a portion 2 near its leading end to provide a folded back portion 3, and a corrugated metal strip 4 is folded back at a portion 5 near its leading end to provide a folded back portion 6. Each folded back portion 3 or 6 thus has a generally U-shaped cross section. Then, these two folded back portions 3 and 6 are interlocked having major portions of the flat and corrugated metal strips 1 and 4 directed in opposite directions. With this, a so-called core portion 7 is constituted by the interlocked portions 3 and 6. Then, two flat holding members 8A and 8B are arranged to put the core portion 7 (viz., the interlocked folded back portions 3 and 6) between the two flat holding members 8A and 8B to keep the shape of the core portion 7.

Figure 3B:
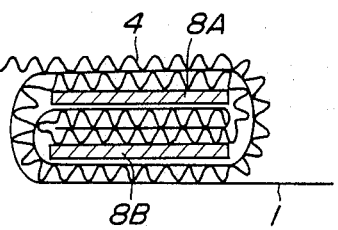
Figure 3C:
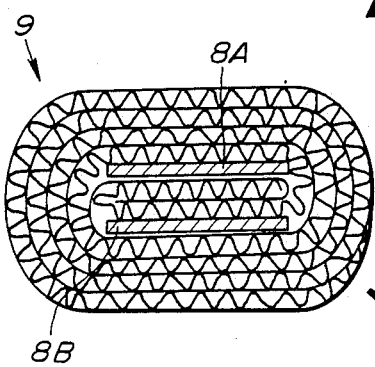
Figure 3D:
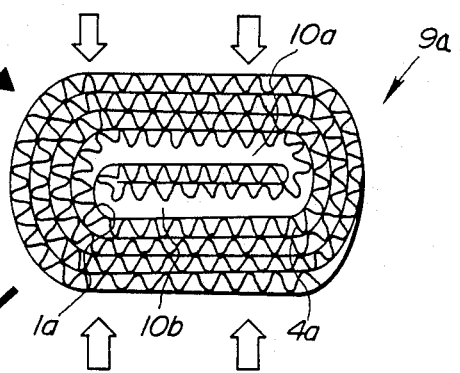
Figure 3E:
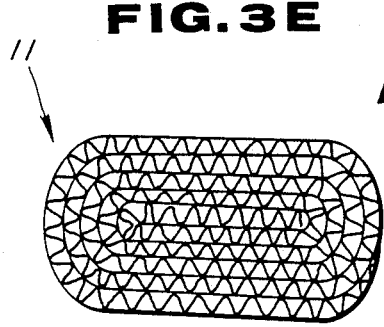

Then, as it can be seen from FIG. 3B, the flat metal strip 1 and the corrugated metal strip 4 are placed on the respective flat holding members 8A and 8B from opposite directions and then wound round the holding members 8A and 8B overlapping one on another. The winding of the flat and corrugated metal strips 1 and 4 is repeated by a predetermined number of times to provide an oval structure 9 as shown in FIG. 3C. Then, as it can be seen from FIG. 3D, the two flat holding members 8A and 8B are drawn from the oval structure 9 thereby leaving two flat bores 10a and 10b in the structure 9. With this, a semi-processed oval assembly 9a is produced. Then, the semi-processed oval assembly 9a is pressed by a suitable external force in such a manner as to eliminate the bores 10a and 10b. With this, the semi-processed oval assembly 9a assumes the tightly wound oval form as shown in FIG. 3E, which is generally designated by numeral 11. A spot welding is then applied to the oval assembly 11 to keep the shape of the same. Then, a suitable catalyst is applied to the inner surfaces of the honeycomb cells of the oval assembly 11. Then, the fixed and catalyst-coated oval assembly 11 is housed in a shell (not shown) to provide a catalytic converter.

Figure 5:
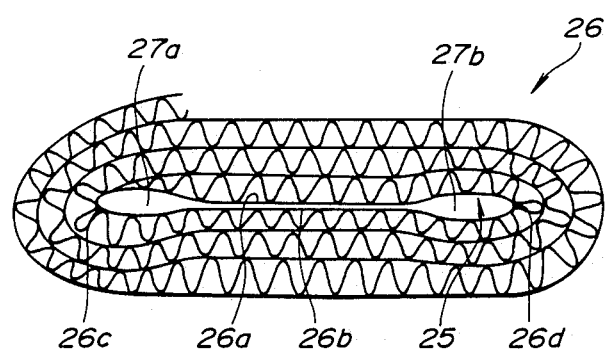
FIG. 5 is a view similar to FIG. 4D, but showing exaggeratively an undesired phenomenon which would occur in the conventional method.

Experiments carried out by the inventor have revealed that when the metal support is produced by the method of the present invention, no pockets such as those designated by reference numerals 27a and 27b (see FIG. 5) are produced. Thus, the drawbacks of the conventional method are solved by the invention.

In the following, further advantages of the present invention will be described.

First, due to the use of the holding members 8A and 8B, the metal support structure 9 can assume an oval shape before it is pressed. This facilitates the work for pressing the semi-processed oval assembly 9a into the tightly wound oval assembly 11.

Second, because the bores 10a and 10b left in the semi-processed oval assembly 9a are generally flat in shape, the pressing work for the assembly 9 requires only a small changing of the curvature laterally opposed ends of each flat bore 10a or 10b. Thus, it is prevented that the strips 1a and 4a (see FIGS. 1D and 3D) positioned near the opposed ends of each bore 10a or 10b are exposed to a big stress.

What is claimed is:

1. A method of producing a metal support for an exhaust gas catalyst, comprising the steps of:
    (a) mating respective end portions of flat and corrugated metal strips in such a manner that respective major portions of the strips extend in opposite directions;
    (b) putting the mated end portions of the strips between two generally flat holding members;
    (c) winding the major portions of said flat and corrugated strips around said holding members overlapping one on another by a predetermined number of times, thereby to produce an oval structure which includes the flat and corrugated metal strips and the holding members;
    (d) drawing said holding members from said oval structure thereby to provide a semi-processed oval assembly which has two generally flat bores left therein; and
    (e) pressing said semi-processed oval assembly in a manner to eliminate the bores thereby to provide a tightly wound oval assembly of said flat and corrugated metal strips.

2. A method as claimed in claim 1, further comprising, before the step (a), (f) folding back the end portions of the flat and corrugated metal strips thereby to provide the strips with respective folded back portions, said folded back portions being interlocked during the step (a).

3. A method as claimed in claim 1, in which each of said generally flat holding members comprises a rectangular cross section.

4. A method as claimed in claim 1, in which each of said generally flat holding members comprises an arcuate cross section.

5. A method as claimed in claim 1, further comprising, in the step (c), putting another pair of holding members on diametrically opposed portions of the semi-processed assembly and in the step (d), drawing said another pair of holding members from said assembly.

* * * * *